(12) United States Patent
Mellemstrand et al.

(10) Patent No.: US 8,042,574 B2
(45) Date of Patent: Oct. 25, 2011

(54) PLUG WITH EXPANDABLE PACKER ELEMENT

(75) Inventors: Jone Mellemstrand, Voll (NO); John Helvik, Stavanger (NO)

(73) Assignee: TDW Offshore Services AS, Stavanger (NO)

( * ) Notice: Subject to any disclaimer, the term of this patent is extended or adjusted under 35 U.S.C. 154(b) by 233 days.

(21) Appl. No.: 12/520,568

(22) PCT Filed: Dec. 12, 2007

(86) PCT No.: PCT/NO2007/000440
§ 371 (c)(1),
(2), (4) Date: Aug. 20, 2009

(87) PCT Pub. No.: WO2008/079016
PCT Pub. Date: Jul. 3, 2008

(65) Prior Publication Data
US 2010/0032044 A1 Feb. 11, 2010

(30) Foreign Application Priority Data
Dec. 22, 2006 (NO) .................................. 20065996

(51) Int. Cl.
*F16L 55/16* (2006.01)
(52) U.S. Cl. ............. 138/89; 138/90; 166/122; 166/135
(58) Field of Classification Search .................... 138/89, 138/90; 166/122, 135, 134
See application file for complete search history.

(56) References Cited

U.S. PATENT DOCUMENTS

| 2,974,685 | A | * | 3/1961 | Ver Nooy Burton | 138/90 |
| 3,291,156 | A | * | 12/1966 | Corsano | 138/89 |
| 3,886,977 | A | * | 6/1975 | Dorgebray | 138/89 |
| 4,188,675 | A | | 2/1980 | Ast | 138/92 |
| 4,332,277 | A | * | 6/1982 | Adkins et al. | 138/89 |
| 4,381,800 | A | * | 5/1983 | Leslie | 138/90 |
| 4,422,477 | A | * | 12/1983 | Wittman et al. | 138/89 |
| 4,465,104 | A | * | 8/1984 | Wittman et al. | 138/89 |
| 4,762,151 | A | | 8/1988 | Kinnan | 138/89 X |

(Continued)

FOREIGN PATENT DOCUMENTS
WO WO 00/03172 1/2000
(Continued)

OTHER PUBLICATIONS

European Patent Office, "Written Opinion of the International Searching Authority," European Patent Office, (Apr. 23, 2008).

*Primary Examiner* — Patrick F Brinson
(74) *Attorney, Agent, or Firm* — Gable Gotwals

(57) ABSTRACT

The present invention relates to an arrangement for use with a plug (1) for sealing against an inner wall of a pipeline (30), comprising a main body and sealing means, which sealing means comprises an annular packer element (7), arranged between two relative movable body elements (5,6) of the main body actuated by actuation means, where the movable elements form surfaces (500,600) in abutment against the packer element (7). The packer element (7) comprises a radially inner section (705) which is mainly incompressible in a direction transverse to a circumferential direction and where sections of the two surfaces (500,600) in abutment against the inner section (705) of the packer element (7) in a retracted position, forms different angles in relation to an axis in radial direction in relation to a longitudinal axis of the plug.

14 Claims, 5 Drawing Sheets

U.S. PATENT DOCUMENTS

Figure 1:
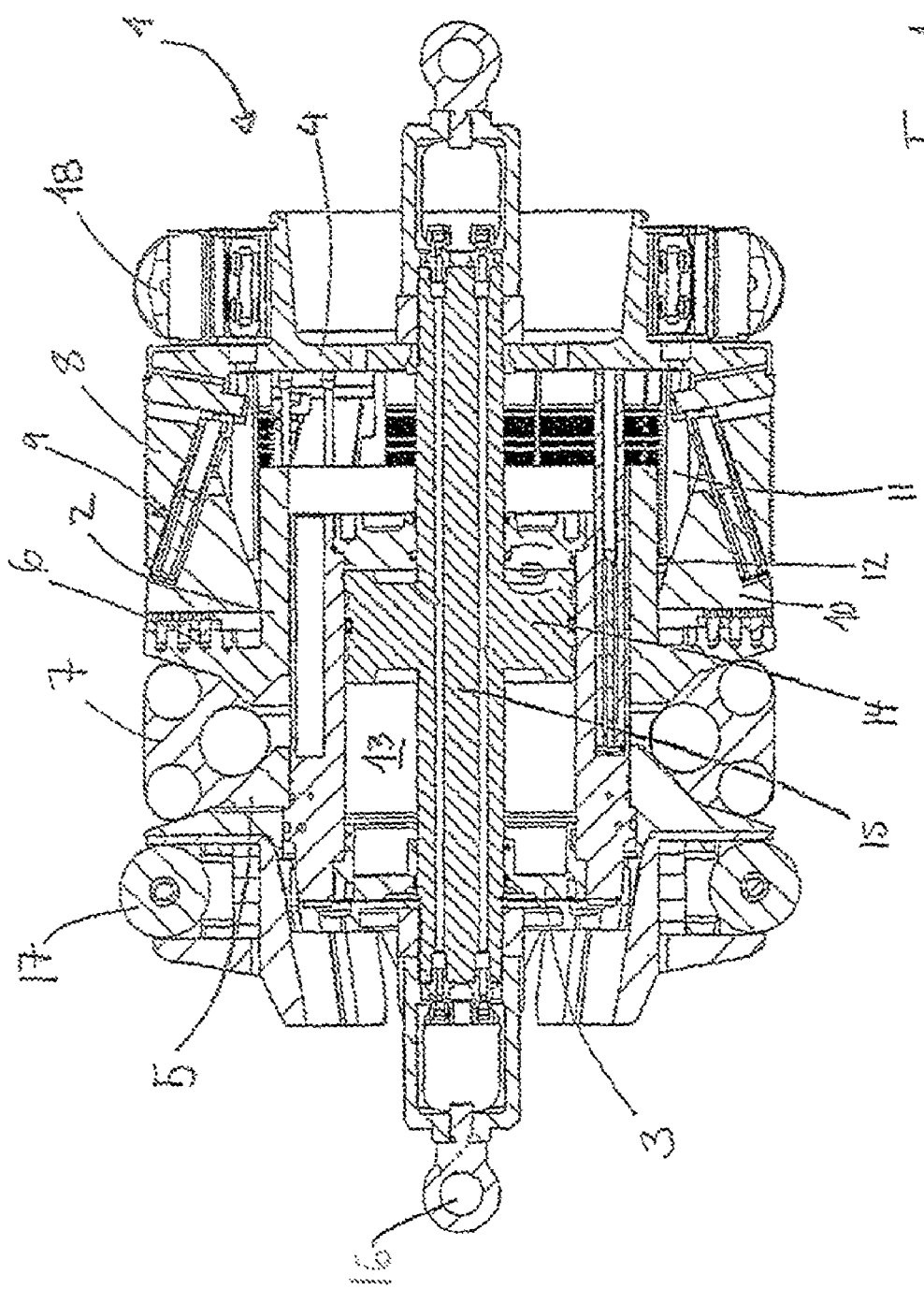

| | | | | |
|---|---|---|---|---|
| 4,817,671 | A | * 4/1989 | Mathison et al. | 138/89 |
| 4,854,384 | A | * 8/1989 | Campbell | 166/122 |
| 4,875,615 | A | * 10/1989 | Savard | 228/119 |
| 4,886,939 | A | 12/1989 | Kinnan | 138/89 |
| 4,991,651 | A | * 2/1991 | Campbell | 166/122 |
| 5,035,266 | A | 7/1991 | Benson et al. | 4/295 |
| 5,293,905 | A | * 3/1994 | Friedrich | 138/89 |
| 5,924,454 | A | * 7/1999 | Dyck et al. | 138/89 |
| 6,129,118 | A | * 10/2000 | Friedrich et al. | 138/89 |
| 6,581,642 | B1 | * 6/2003 | Ritchie et al. | 138/90 |
| 6,732,762 | B2 | * 5/2004 | Russell | 138/89 |
| 7,568,504 | B2 | * 8/2009 | Syse et al. | 138/31 |
| 7,878,221 | B2 | * 2/2011 | Aleksandersen et al. | 138/98 |
| 2005/0241710 | A1 | * 11/2005 | Early et al. | 138/89 |
| 2009/0272451 | A1 | * 11/2009 | Aleksandersen et al. | 138/89 |

FOREIGN PATENT DOCUMENTS

| | | |
|---|---|---|
| WO | WO 03/067134 | 8/2003 |
| WO | WO 2005/054738 | 6/2005 |
| WO | WO 2006/101398 | 9/2006 |

* cited by examiner

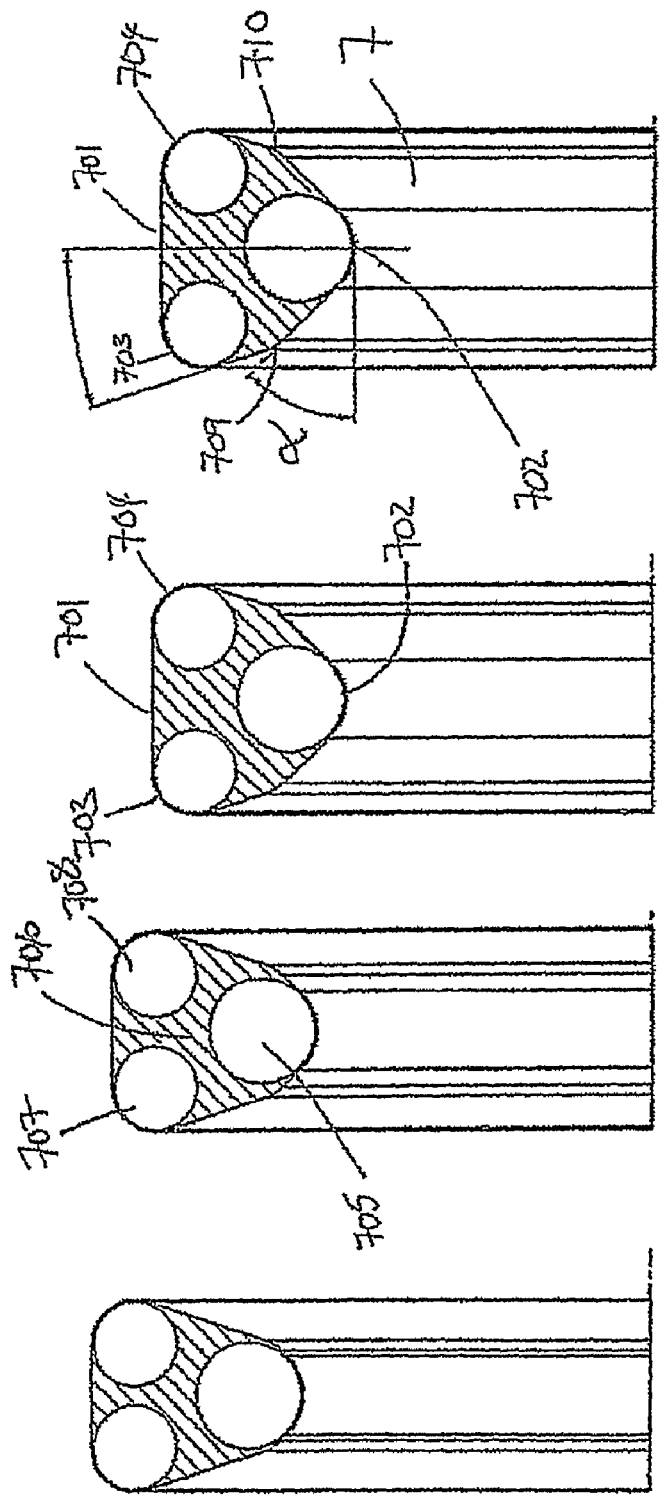

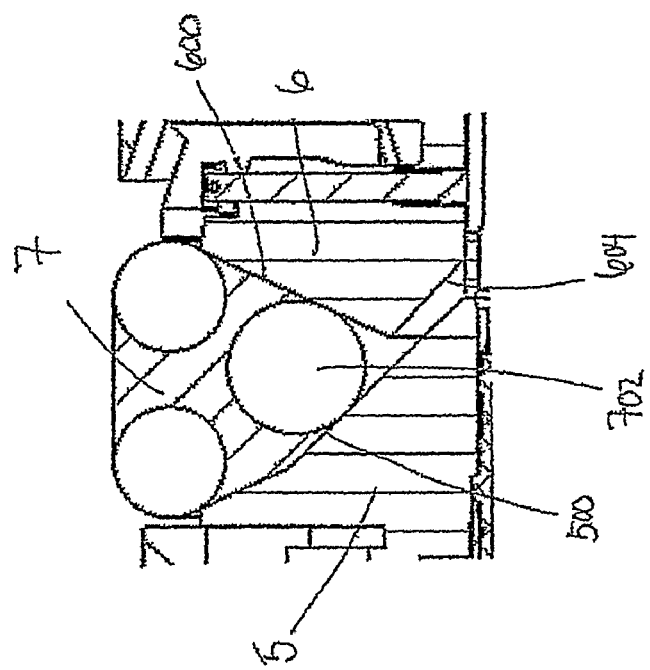
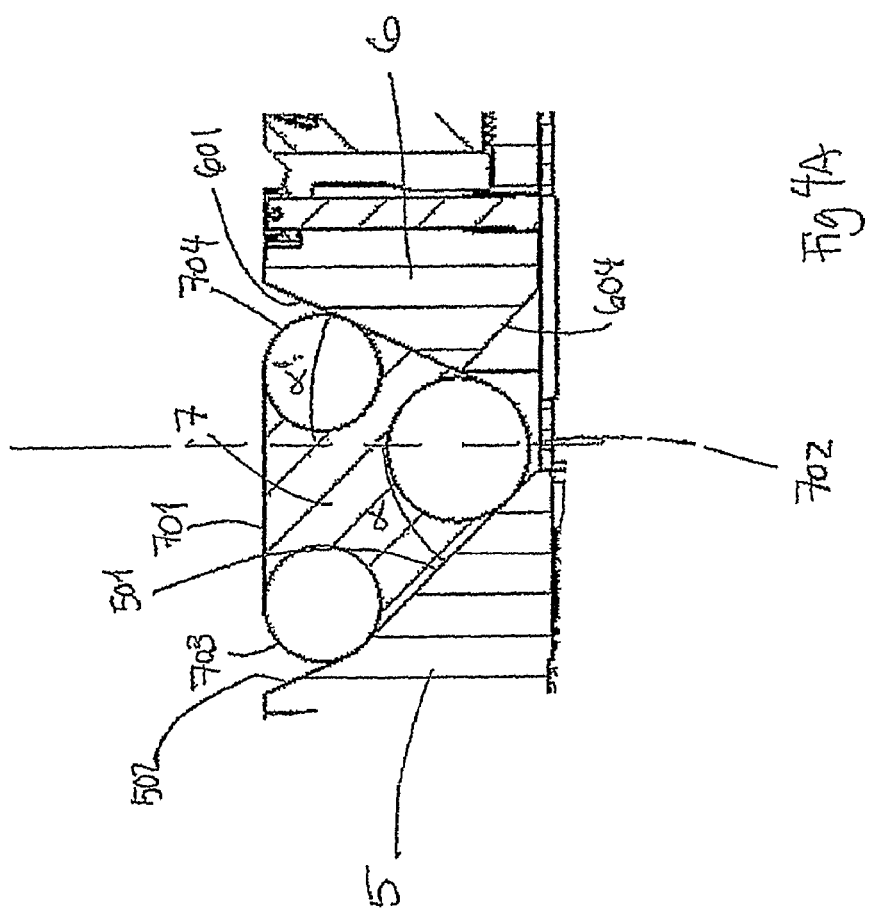

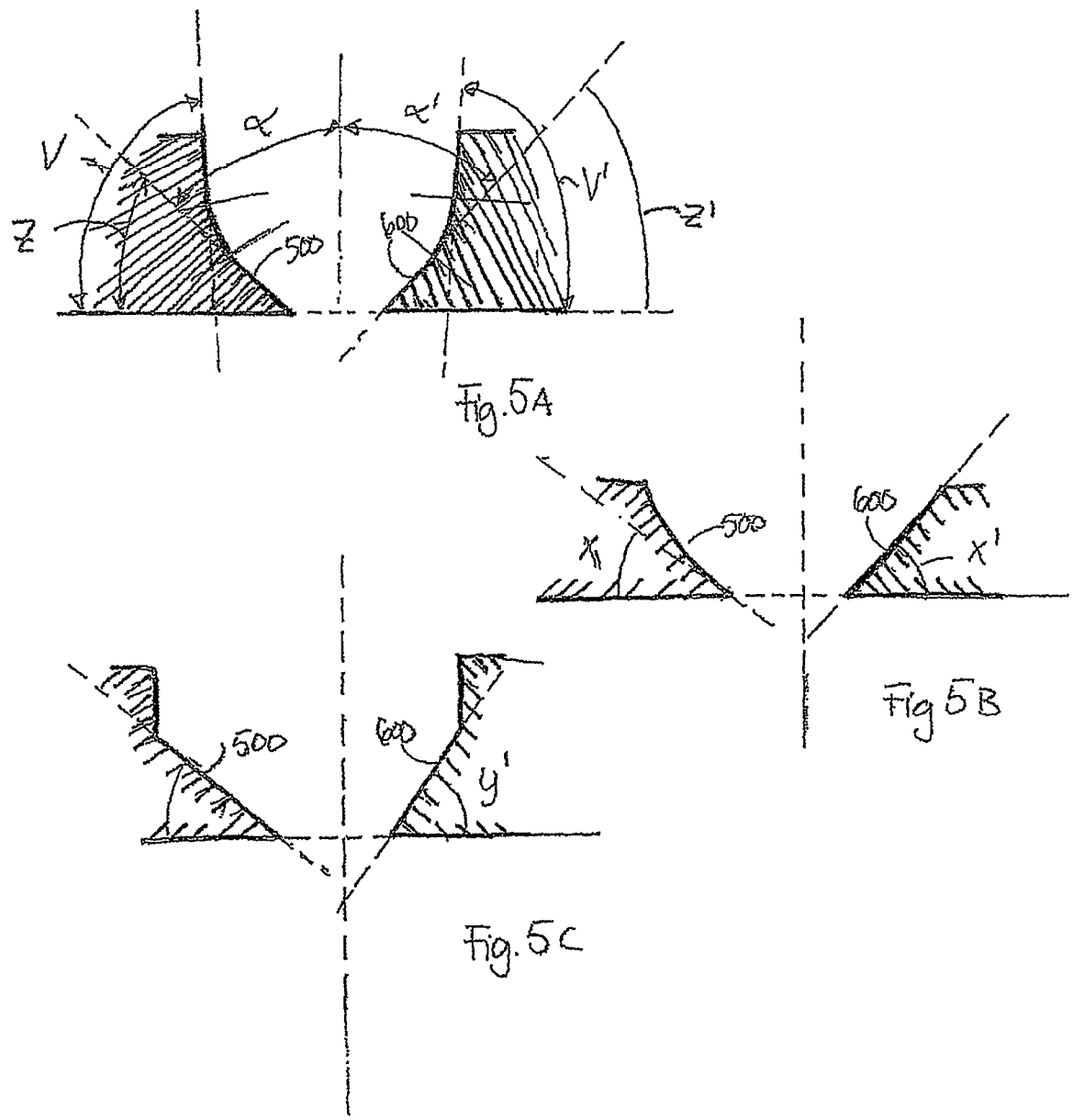

PLUG WITH EXPANDABLE PACKER ELEMENT

CROSS-REFERENCE TO PENDING APPLICATIONS

This application is based on PCT Patent Application No. NO2007/000440, filed on Dec. 12, 2007, which was based on Norwegian Patent Application No. 20065996, filed Dec. 22, 2006.

The present invention relates to an arrangement at a plug for sealing against an inner wall of a pipeline, where the plug comprises a main body and sealing means actuated by actuation means.

There is a general need for sealing off pipelines when performing maintenance, branching, repair etc. of for instance an already laid pipeline. There is also a need for the possibility of having means for sealing against an inner wall of a pipeline to separate a part of a pipeline from a production flow within the pipeline. Using a plug which is inserted into the pipeline, guided to the site to be sealed off and then set, is a procedure which is cost effective, flexible and possible in most pipelines. These plugs may be run into the pipeline with an umbilical or be autonomous plugs that are pigged and or moved by tractor units within the pipeline. Such an autonomous plug may for instance be used in long subsea pipelines for sealing these off at the desired site, and thereafter removed from the pipeline when the work is done.

Since these plugs are removable, they may be used several times, and it is therefore favorable to have a plug which may be used in pipelines with different internal diameters, so that one plug may be used for a range of internal diameter. It is of most importance that the plug when it is inserted into a pipeline and sat inside the pipeline, totally seals against the inner wall of the pipeline and thereby possibly establish a barrier between two separated sections of the pipeline one on each side of the plug. In this it is important that the sealing means has a good sealing effect against an inner wall of a pipeline with different diameters. There is also another general desire of plugs which have a small outer diameter in an non-expanded state and at the same time have a large as possible range for use and at the same time are as short as possible to be able to be moved around bends in the pipeline for having good usage of the plug for different internal diameters.

There is an aim with the present invention to provide an arrangement at a plug which gives good sealing effect at a large range of setting diameters of the plug. There is another aim to provide a sealing system which gives large diameter change from retracted to fully extended position. There is also an aim to provide a plug which has a low self-locking pressure. Another aim is to achieve a solution so that when moving the sealing means from a retracted to an extended stated one are able to achieve a good sealing effect at almost all the different positions between fully extended and fully retracted.

These aims are achieved with an arrangement at a plug as described in the following claims. Alternative aspects of the invention are stated in the dependent claims.

The present invention regards an arrangement for use with a plug for sealing against an inner wall of a pipeline. Either for sealing off the pipeline or for sealing off a part of a cross section of the pipeline from the production flow in the pipeline. With other words the plug may create a barrier separating the pipeline in two separate section where no fluid is allowed to pass across the pipeline, or as a possibility the plug may seal off a part of the cross section allowing fluid to pass across the plug through the rest of the cross section of the pipeline.

The plug will comprise a main body, sealing means and actuation means for moving the sealing means from a retracted to an extended position in contact and sealing engagement with the inner wall of the pipeline. The main body will in a normal configuration comprise several body elements. The sealing means comprises an annular packer element, arranged circumferential around the main body of the plug, between two relative movable body elements of the main body. The movable elements form surfaces in abutment against the packer element. By moving the movable elements towards and from each other the packer element is moved from a retracted to an extended position in sealing contact with an inner wall of a pipeline. The movement of the movable elements is preferably in a direction mainly parallel with a longitudinal axis of the plug, which axis is mainly parallel with a centre axis of the pipeline at the site for setting the plug.

According to the invention, the packer element comprises seem in a cross section taken in a radial direction, transverse to a circumferential direction, a radially inner section which is substantial incompressible in a direction transverse to a circumferential direction. According to the invention sections of the two surfaces in abutment against the inner section of the packer element in an retracted position, will form different opposite angles in relation to an axis in radial direction in relation to a longitudinal axis of the plug. These sections of the surfaces will therefore when seen in a cross section transverse to a circumferential direction form the legs of a lopsided V-shape. In a possible configuration the lopsided V shape will tend to have the leg of the V-shape closest to a right angle, on the side of the packer element normally exposed to the higher pressure around the plug in a set configuration of the plug, when pressure is reduces on one side of the plug.

A section of a surface should in this application be understood to also be a part of a continued surface. The surface may from a section of a surface continue with the same configuration without a border into a next section or continue with a different configuration in the next section.

By such a configuration with packer element and lopsided V-shaped abutting surfaces one achieves sealing means where the movement of the packer element is an even movement in a radial direction when moved from a retracted to an extended position. This gives good sealing effect for a range of inner diameters of the pipeline with the same plug and packer element. One achieves by this sealing means with good pressure transferral through the whole of the packer element, and thereby good sealing effect and a relative low self locking pressure for the packer element in a sealing contact.

The radially inner section of a cross section of the annular shaped packer element, which section run all the way in a circumferential direction, is with other words less elastic than a section of the packer element arranged radially outwards of this inner section. The inner section is also preferably more elastic in a circumferential direction than in the directions transverse to the circumferential direction. The inner section has therefore a higher rigidity than a middle section of the packer element. By substantial incompressible one should understand that the section may be compressed but that it is much more incompressible than other sections of the packer element. This inner section will for instance when the packer element is moved to an extended state where the packer element is extended in an circumferential direction and an inner point of the packer element is moved radially outwards, be deformed and thereby compressed in a direction transverse to the circumferential direction. It is the extension in the circumferential direction which may give such a compression, while at the same time the inner section is substantial incompressible if the inner section is not extended in the circumferential direction. According to an aspect the annular shaped packer element has in a cross section at least three sides, where one apex is positioned radially inward, and a surface between two apexes is in contact with the pipeline wall in an extended state of the packer element.

According to one aspect of the invention at least one of the surfaces abutting the packer element, in a retracted and extended position, will form varying angles with a longitudinal axis of the plug from a radial inner section to a radial outer section. There are alternative solution to achieve this, one possible solution is that the at least one surface may comprise at least one curved section. Another possibility is that the at least one surface may comprise at least two linear sections. In such a configuration at last one surface may comprise a first inner section with an angle $\alpha$ with the longitudinal axis and a second outer section with an angle $\beta$ with the longitudinal axis, where the angle $\alpha$ is smaller than the angle $\beta$, giving a less steep inner section and a relative steeper outer section when looking at the surface relative a longitudinal axis of the plug from the packer element. There may also be solutions where these elements are combined by having an innermost section with a first angle, a curved section following and thereafter a second linear section with a different angle than the first linear section. By such a solution one achieves good pressure distribution within the packer element with a shorter relative movement of the two body elements abutting the packer element, and at the same time a relative rapid radial movement of the packer element from a retracted to an extended state.

By this one achieved the possibility of having a shorter plug. There is also the possibility of having varying angles even if the angles of the two surfaces abutting the packer element in a retracted state are similar in opposite directions relative a radial axis.

According to an aspect of the invention the packer element may in a cross section transverse to a circumferential direction, form a triangle, four sides, pentagon or other multisided shape where an apex and area around this apex forms the innermost section and a side between two apexes is abutting an inner wall of the pipeline in an extended state of the packer element.

When moving the packer element between a retracted and an extended position an inner section of the packer element is moved outwards in a radial direction. The arrangement of the body elements forming the abutting surfaces may be formed such that a section of one of the surfaces abutting the packer element in a retracted position is covered by a part of the other body element in an extended position. One will try to avoid to have the two abutting surfaces abut each other in an extended state of the sealing means to make sure the pressure load between the two body elements are transferred through the packer element and thereby achieve a good sealing effect against an inner wall of a pipeline.

According to an aspect the packer element may comprise three sections with larger rigidity than the rest of the packer element, which sections are arranged in three corners of for instance a triangular cross section. One of these sections is formed by the inner section as mentioned above, the other two sections are positioned on opposite sides of the side of the packer element in contact with the inner wall of the pipeline in an extended state of the sealing means. One function of these sections is to decrease the flexibility and thereby maintain the main shape of the packer element, another is to achieve the desired pressure within the packer element to achieve a good sealing effect between the packer element and an inner wall of a pipeline. Such an increased rigidity may be achieved by providing springs embedded in the material forming the packer element. The springs, formed with the spirals of the spring around a longitudinal axis of the spring, where the longitudinal axis for the spring embedded in the packer forms a circle, are almost incompressible in a direction transverse to the longitudinal axis of the spring, but are more elastic in the direction of the longitudinal axis, thereby giving the desired effects.

According to an aspect the plug may comprise anchoring means, comprising of a set of slips arranged movable relative a body element of the main body formed with a conical outer surface, and where the actuation means when actuating the sealing means also actuate the anchoring means. The configuration of the slips and the conical surface of the main body may be a kind which gives a locking effect when there is a pressure difference across the plug.

According to another aspect the actuation means may comprise a main fluid operated piston and cylinder arrangement centrally arranged within the main body of the plug, where the cylinder chamber is connected to one end plate of the plug and the piston is connected to an opposite end plate of the plug.

Figure 2A:
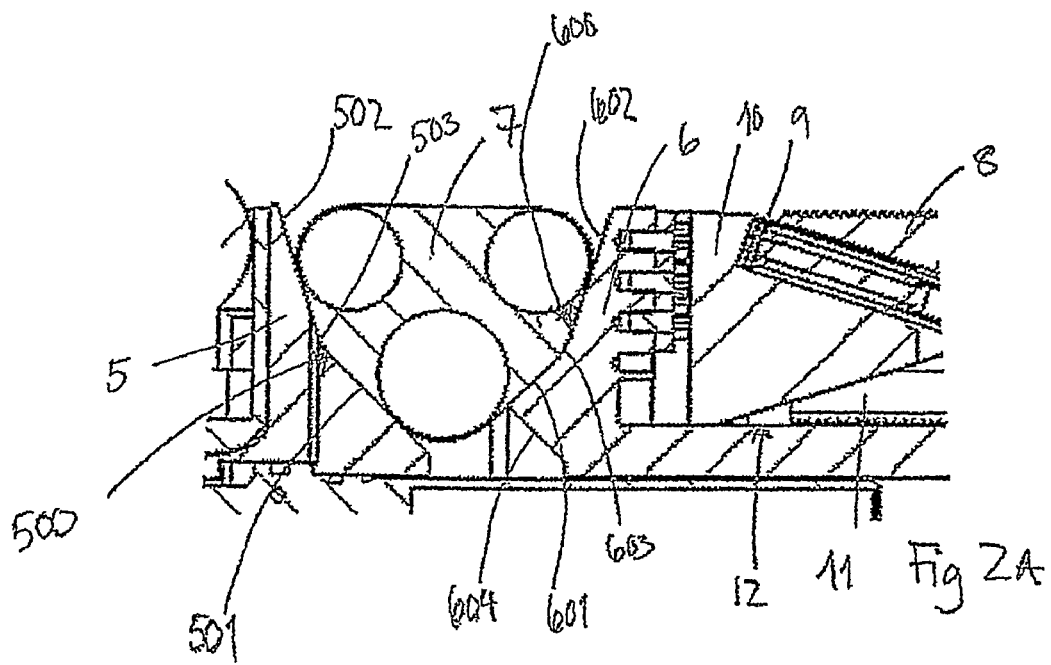

The present invention will now be explained with further embodiments of the invention and with reference to the accompanying drawings, where:

FIG. 1 shows a plug for sealing off a pipeline with an arrangement according to the invention in a retracted state FIGS. 2A and B shows the details of the sealing means of the plug in FIG. 1 in a retracted state and extended state within a pipeline, FIG. 3 show a second embodiment of an arrangement according to the invention in a retracted and extended state, FIG. 4A-B shows a cross section of a packer element in a retracted and extended state of the packer element FIG. 5A-C shows different possible configuration principles of the abutting surfaces.

There are used same the reference numeral for elements with similar functions in the different embodiment.

In FIG. 1 there is shown a plug 1 in a retracted state outside a pipeline. The plug 1 comprises a main body 2, comprising of a first end plate 3 and a second end plate 4, which end plates 3,4 are exposed to the fluid at the two different sides of the plug in a set state of the plug 1 within a pipeline, a first body element 5 and a second body element 6 arranged to be movable relative each other by movement in a longitudinal axis of the plug 1. The first body element 5 is arranged on one side of the annular shaped packer element 7 and the second body element 6 is arranged on the opposite side of the packer element 7, and when these are moved towards each other the packer element is pushed outwards into contact with a pipeline wall. The shown plug 1 also comprise anchoring means in the form of slips 8 arranged around the circumference of the main body 2 in abutment against a bowl surface 9 for relative movement between this and the slips 8 to move the slips 8 outwards into contact with a pipeline wall. In this embodiment the bowl surface 9 is formed by a first wedge means 10 in abutment against second wedge means 11, which is abutting a body surface 12, which all interact with each other to move the bowl surface 9 in an outwards direction during the setting of the slips 8. By such an arrangement one achieves a rapid radially outwards movement of the slips and they may be set at any position in this movement. The plug may comprise anchoring means with a bowl surface formed directly by a plug body element without the wedge means. The plug comprises further actuation means in the form of a centrally located cylinder and piston arrangement with a cylinder chamber 13 arranged centrally within the main body 2. Within the cylinder chamber 13 there is arranged a piston head 14 with a piston rod 15 which is through going the whole of the piston chamber 13 and out through the end plates 3,4 with connection means 16 on both ends of the piston rod 15. The plug 1 further comprises first centralising means 17 arranged around the circumference of the plug body 2 close to the first end plate 3 and in a similar manner second centralising means 18 close to the second end plate 4. The relative movable elements of the main body 2 are connected to each other by for instance T-shaped protrusions and grooves. The plug will further comprise necessary sealing elements between the elements in the plug, fluid lines and valves etc for operation of the piston/cylinder arrangement and other means for operation of the plug which will be evident for a skilled person and which elements are not a part of the invention and therefore not explained in further detail.

Figure 2B:
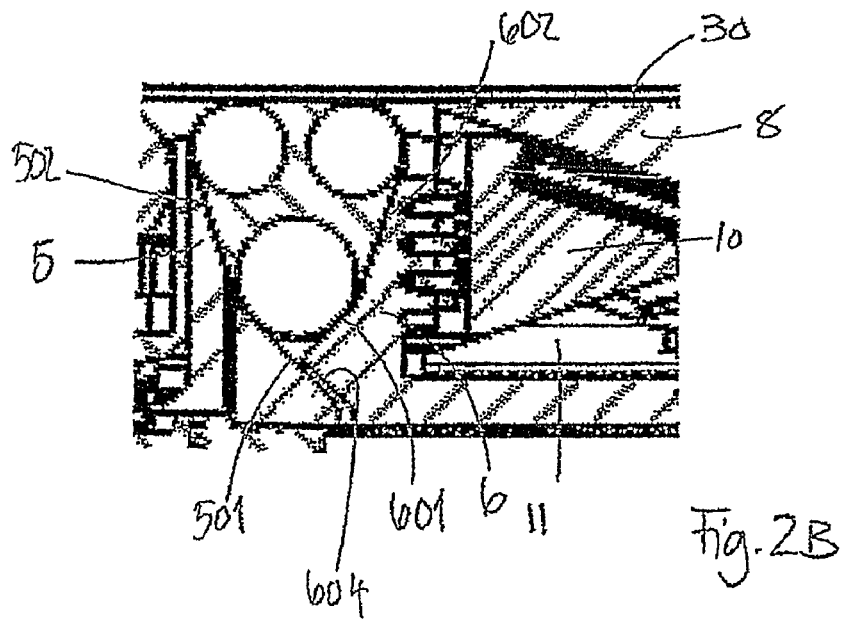

In FIG. 2A there is shown a detail of the plug in FIG. 1 and in FIG. 2B the same plug is shown in a sat position within a pipeline 30. The first body element 5 and second body element 6, are moved relative toward each other to press the packer element 7 into contact with an inner wall of the pipeline 30.

In FIG. 2A there is shown that the first body element 5 comprises a surface 500 for abutment against the packer element 7. This surface 500 is an annular surface abutting the annular packer element 7. In a cross section transverse to the circumference, this surface 500 comprises an inner section 501, which inner section 501 is mainly linear and forms a first angle with a longitudinal axis of the plug, the surface 500 is further continued in a second section 502, which second section 502 is linear and forms a different angle with the longitudinal axis, and there is between these two sections 501,502 a transition section 503, which forms a curved line in the cross section.

In a similar manner the second body element 6 comprises an annular surface 600 abutting the packer element 7. In a cross section transverse to a circumference, this surface also comprises a first inner section 601 which is formed by a linear line which forms an third angle with a longitudinal axis. The surface 600 forms in the cross section in addition to the first inner section 601 a second linear outer section 602 with a transition section 603, forming a curved line. This second body element 6 comprises further an undercut section 604, which undercut section in a extended state of the plug covers a part of the inner section 501 of the first body element 5, as shown in FIG. 2B. The first and third angles are opposite angles relative a radial axis and are at the same time different.

In FIG. 3 there is shown a possible configuration of a packer element 7 in different states with a retracted position to the right in the figure and then three different states of extended states. The packer element has in a retracted state five sides and forms a pentagram in a cross section transverse to a circumference. A first side 701 of the packer element 7 will be in contact with an inner wall of a pipeline, this first side 701 is limited by a third and fourth apex 703,704. A first apex 702 forms a radially inner point of the packer element 7. There is in connection with this first apex 702 formed a first inner section 705 of the packer element, which inner section 705 has a larger rigidity than section 706 arranged radially outwards in relation to this inner section 705. The packer element 7 further comprises a second section 707 and a third section 708, which sections 707,708 also has a larger rigidity than the rest of the packer element 7. These three sections 705, 707, 708 are positioned in areas of the packer element 7 which are not fully supported by the surfaces of the first and second body element of the plug in a retracted and or extended state of the packer element. As one may see from the figure the packer element 7 will even if it is a pentagon in a retracted state form a mainly triangular shape in a fully extended state as seen to the left in the figure.

FIGS. 4A and B shows a second embodiment of an arrangement according to the invention. In this embodiment the first body element 5 comprises in a cross section transverse to a circumference a first linear inner section 501 and a second outer linear section 502 which two sections forms different angles with a longitudinal axis. The second body element 6 in this embodiment has an annular surface 600 for abutment against the packer element 7 which surface 600 in a cross section transverse to a circumference is formed with just a first linear section 601. The angle $\alpha$ formed by the first section 501 of the first body element with an axis transverse to a longitudinal axis of the plug, is different than then angle $\alpha'$ the first section 601 of the second body element 6 forms with the same axis, when looking at them mirrored around a radial axis.

The second body element 6 comprises also as the previous embodiment an undercut section 604. The packer element 7 has a mainly triangular form in a cross section in a retracted state, but the triangle is not symmetrical. The packer element comprises three sections with a larger rigidity than the rest of the packer element arranged in the corners of the triangular shape. This increased rigidity may be achieved by embedding spring elements in the material of the packer element in these sections.

In FIG. 5A-C there are shown several configurations of the surfaces 500, 600 abutting a packer element. In FIG. 5A there is shown a configuration where both surfaces in a cross section comprises of a linear inner section, forming an angle z, z" with a longitudinal axis of the plug, continuing in a curved section and thereafter a further outer linear section, forming an angle v, v" with the longitudinal axis of the plug. The inner sections of the first and second body element form different angels $\alpha$, $\alpha'$ (similar to the references in relation to FIG. 4), with a radial axis, mirrored around this. The angles z, z' are thereby normally different and opposite angles. The angles v, v' may be equal and opposite or different and opposite. In FIG. 5B one of the surfaces 500 comprises of a curved section which in the inner part forms an angle x and the other surface 600 is formed by a linear surface, forming an angles x' with a longitudinal axis of the plug. In the third embodiment in FIG. 5C both surfaces 500, 600 comprises two linear sections. The first body element having a surface 500 with an inner section forming an angle y and an outer section at right angle with a longitudinal axis of the plug. The Other surface 600 comprises an inner section forming an angle y' and an outer section at right with a longitudinal axis of the plug. Also other combinations may be possible.

The invention has now been explained with different embodiments. The invention is not limited to these embodiments and modifications and alterations of these embodiments that fall within the scope of the invention as defined in the following claims are possible.

The invention claimed is:

1. An arrangement for a plug for sealing against an inner wall of a pipeline, said arrangement comprising:
   a main plug body having at least two elements moveable relative to one another ;
   a sealing means having an annular packer element, arranged between said moveable elements of said main body, said movable elements each have a surface in abutment against said packer element; and
   an actuation means for moving said sealing means from a retracted position to an extended position in contact with the inner wall of the pipeline;

wherein said packer element has a radial inner section which is mainly incompressible in a direction transverse to a circumferential direction and where sections of the two surfaces in abutment against the inner section of the packer element in a retracted position, form different angles in relation to an axis in a radial direction in relation to a longitudinal axis of said main plug body.

2. The arrangement according to claim 1, further comprising at least one of said surfaces abutting said packer element forms varying angles with said longitudinal axis of said main plug body from a radial inner section to a radial outer section.

3. The arrangement according to claim 2, said at least one abutting surface comprising at least one curved section.

4. The arrangement according to claim 2, said at least one abutting surface comprising at least two linear sections.

5. The arrangement according to claim 4, said at least one abutting surface comprising a first inner section with an angle a relative to said longitudinal axis and a second outer section with an angle β relative to said longitudinal axis, wherein said angle α is smaller than said angle β.

6. The arrangement according to claim 1, further comprising said packer element in a cross section transverse to a circumferential direction forms a mainly triangular shape in said retracted position.

7. The arrangement according to claim 1, further comprising said packer element in a cross section transverse to a circumferential direction forms a mainly four sided shape in said retracted position.

8. The arrangement according to claim 1, further comprising said packer element in a cross section transverse to a circumferential direction forms a pentagon in said retracted position.

9. The arrangement according to claim 1, further comprising an inner section of the packer element in abutment against an inner section of the main body in said retracted position, is moved outward in a radial direction when extended from said retracted position.

10. The arrangement according to claim 9, further comprising a section of one of said surfaces abutting the packer element in a retracted position is covered by a part of the other body element in an extended position.

11. The arrangement according to claim 1, said packer element comprising three sections with larger rigidity than the rest of the packer element, said sections are arranged in three corners of a cross section.

12. The arrangement according to claim 11, said sections comprising a spring embedded in said packer element.

13. The arrangement according to claim 1, said plug comprising a set of slips arranged movable relative a body element of the main body formed with a conical outer surface, and where the actuation means when actuating the sealing means also actuate said set of slips.

14. The arrangement according to claim 1, said actuation means comprising a main fluid operated piston and cylinder centrally located within said main plug body, wherein said cylinder chamber is connected to an end plate of said plug and said piston is connected to an opposite end plate of said plug.

* * * * *